United States Patent [19]
Lhospice

[11] Patent Number: 4,779,971
[45] Date of Patent: Oct. 25, 1988

[54] EYEGLASS FRAME FRONT ASSEMBLY

[75] Inventor: Bernard Lhospice, Blois, France

[73] Assignee: Essilor International Cie Generale d'Optique, Creteil, France

[21] Appl. No.: 852

[22] Filed: Jan. 6, 1987

[30] Foreign Application Priority Data

Jan. 10, 1986 [FR] France ............................... 86 00276

[51] Int. Cl.<sup>4</sup> .............................................. G02C 5/00
[52] U.S. Cl. ....................................... 351/86; 351/41; 351/154
[58] Field of Search ...................... 351/41, 83, 86, 154

[56] References Cited

FOREIGN PATENT DOCUMENTS 0146317  6/1985  European Pat. Off. .
1015976 10/1952  France .
1543216 10/1968  France .
85/02688 6/1985  PCT Int'l Appl. .

Primary Examiner—Rodney B. Bovernick
Assistant Examiner—Jay Ryan
Attorney, Agent, or Firm—Charles E. Brown; Charles A. Brown

[57] ABSTRACT

The front assembly of an eyeglass frame comprises two rim members. Each of these is adapted to hold a respective lens. The two rim members are joined together by a bridge member. Each rim member comprises at least one part made from a shape memory alloy and a main part made from a neutral material.

8 Claims, 1 Drawing Sheet

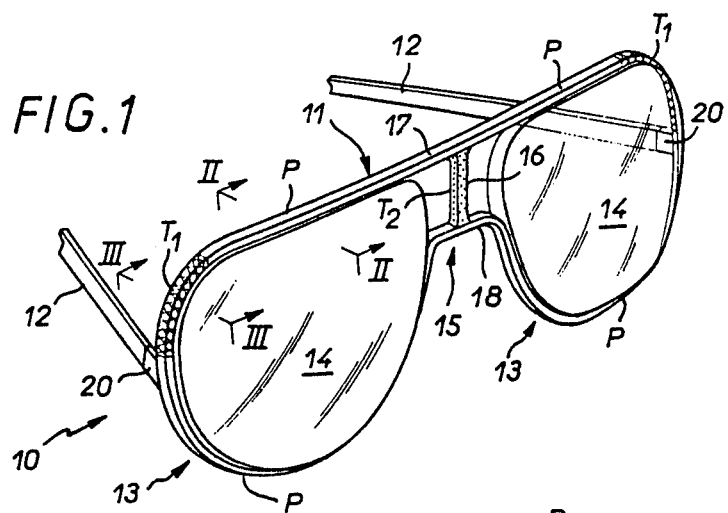
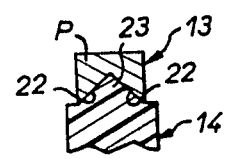
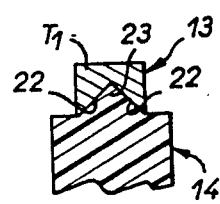
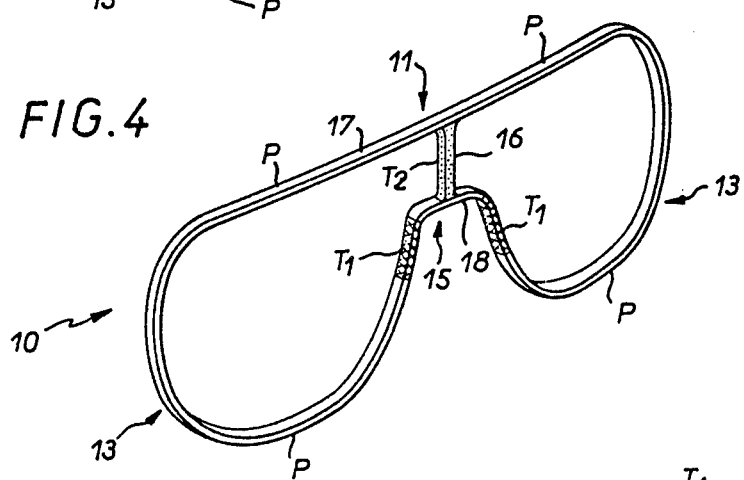
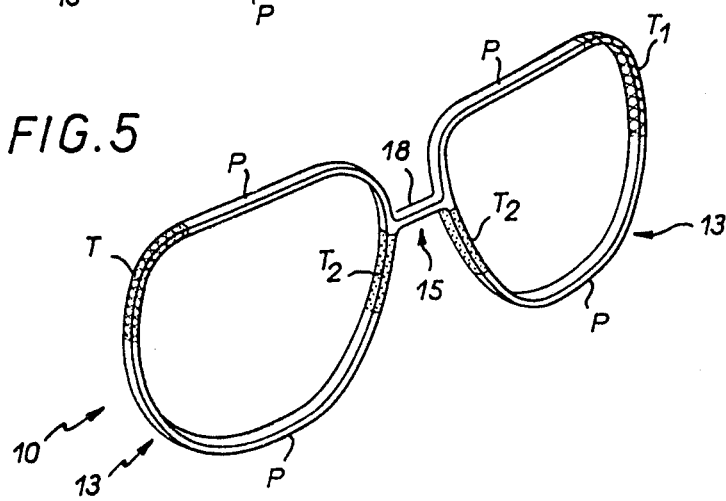

EYEGLASS FRAME FRONT ASSEMBLY

BACKGROUND OF THE INVENTION

1. Field of the Invention

The present invention is generally concerned with eyeglass frames and is more particularly directed to the front assembly, that is to say the part comprising two rim members or surrounds each adapted to hold a lens and joined to the other by a central bridge member and to the sides of which are hinged supporting side members.

To be more specific, the present invention is directed to the situation where the rim members or surrounds that a front assembly of this kind comprises are made wholly from a relatively rigid material, in practise from metal, to the exclusion of the case where they consist wholly or in part of a flexible tie member.

2. Description of the Prior Art

One of the problems to be overcome in manufacturing a front assembly in which the rim members or surrounds are made from a relatively rigid material results from the fact that in order to fit a lens into the rim members or surrounds it is necessary to provide a localized gap in their continuity so that they can be "opened out" and the fact that in order to "close" them after a lens has been fitted it is necessary, in order to retain the lens, to add to them closing means adapted to hold them in a closed configuration.

This is usually a screw.

In spite of the care taken in implementing a screw of this kind, and in spite of arrangements that may be adopted to prevent it unscrewing, it may nevertheless become unscrewed, prejudicing the retention of the lens concerned.

To avoid the disadvantages inherent to the use of a screw and those inherent to the use of any other closing means, it has already been proposed to use a shape memory material, to be more precise a shape memory alloy, in the construction of an eyeglass frame front assembly.

As is known, a shape memory alloy is an alloy which, as a result of temperature changes only, can change reversibly between two separate phases in the solid phase, the so-called austenitic phase and the so-called martensitic phase, for each of which it may be given a different shape that it spontaneously recovers at the corresponding temperature.

By virtue of such thermo-elastic behavior it is possible to obtain with a shape memory alloy a significant capacity for expansion between two specific temperatures, usually in the order of 5 to 8%, and in any event considerably greater than the usual capacity for thermal expansion.

In the international patent application filed under application No. PCT/US 84/02004 and published under the number WO85/02688, the thermo-elastic properties of shape memory alloys are used in the manufacture of eyeglass frame front assemblies.

In this international patent application, however, the rim members or surrounds of a front assembly of this kind are made from shape memory alloy over all of their circumferential length, even where the rim member or surround is reduced to two separate sections, one on the nose side and the other on the temple side, and these rim members or surrounds have, for the purpose of retaining the lens, a C-shaped transverse profile so as to grip the two opposite sides of a lens.

The corresponding implementations are inevitably costly and as they differ from conventional implementations using a bezel, for dealing with which practitioners have specific equipment, commercial use of them on a more widespread scale is difficult.

A general objective of the present invention is an arrangement which, while exploiting the benefits of shape memory alloys, is able to avoid these disadvantages and confer other advantages.

SUMMARY OF THE INVENTION

The present invention consists in an eyeglass frame front assembly comprising two rim members each adapted to hold a respective lens and a bridge member joining said two rim members together, wherein each rim member comprises at least one part made from a shape memory alloy and a main part made from a neutral material.

This means that the quantity of shape memory alloy used is minimal, which is beneficial to the overall cost of the assembly.

Also, as any such section in shape memory alloy is in practise continuous with the main part of the rim member or surround made from neutral material of which it forms part, it may, if necessary, be formed with a conventional bezel, like the rim member or surround, with the result that the assembly utilizes the standard techniques of this art, with evident advantages.

In one preferred embodiment of the invention each of the rim members or surrounds of the eyeglass frame front assembly in accordance with the invention comprises two spaced sections made from shape memory alloy, either with these sections being both individualized for each of the rim members or surrounds or, the central bridge member comprising a crossmember common to the two rim members or surrounds, one of them forming part of said crossmember and the two shape member alloy sections that each of these rim members of surrounds thus features having different characteristics.

By virtue of an arrangement like this is advantageously possible to fit lenses in two stages.

In a first stage only a first of the two shape memory alloy sections thus employed is used, that having the greater expansion characteristic, and the corresponding operation applies independently to the two rim members or surrounds to be fitted with lenses, which advantageously makes it possible to manipulate only one lens at a time so that the corresponding operation is safer.

In a second stage the second of the two shape memory alloy sections, that having the lower expansion characteristic, is in turn called into play to complete the closing of the rim members or surrounds onto the lenses fitted into them, and assuming that this second section forms part of a crossmember common to both the rim members or surrounds, this operation is advantageously applied simultaneously to both of them.

The characteristics and advantages of the invention will emerge from the following description given by way of example with the reference to the appended diagrammatic drawings.

BRIEF DESCRIPTION OF THE DRAWINGS

FIG. 1 is a partial view in perspective of a pair of eyeglasses comprising a front assembly in accordance with the invention.

FIGS. 2 and 3 are partial views of this front assembly to a larger scale and in cross-section on the respective lines II—II and III—III in FIG. 1.

FIG. 4 is a perspective view of an alternative embodiment of front assembly in accordance with the invention.

FIG. 5 is a perspective view analogous to that of FIG. 4 for a further embodiment of the invention.

DESCRIPTION OF THE PREFERRED EMBODIMENTS

FIG. 1 shows a pair of eyeglasses.

The frame 10 of the eyeglasses comprises a front assembly 11 and two supporting side members 12 one on each side of the front assembly and each hinged to one side of it; the front assembly 11 comprises two rim members or surrounds 13 each of which is adapted to have a lens 14 fitted to it and which are joined together by a central bridge member 15.

By lens 14 is here meant, in the usual way, any form of ophthalmic, prescription or afocal lens, tinted or not.

In the embodiment shown in FIG. 1 the central bridge member 15 comprises a substantially vertical crossmember 16 which is common to the two rim members or surrounds 13 and joins together an upper bar 17 and a lower bar 18 each formed by horizontal extensions from said rim members or surrounds 13 continuous therewith.

In accordance with the invention, using shape memory alloy, only part of the rim members or surrounds 13 is made from shape memory alloy, each of the rim members or surrounds 13 comprising along its length, that is to say circumferentially around the corresponding lens 14, at least one section T made from shape memory alloy alternating locally with a main part P made from a neutral material.

In the embodiment shown in FIG. 1 each of the rim members or surrounds 13 therefore comprises two spaced sections T made from shape memory alloy, namely a section T1 situated on the temple side and a section T2 situated on the nose side.

To be more precise, in this embodiment the section T2 situated on the nose side forms part of the crossmember 16 that is common to the two rim members or surrounds 13.

This crossmember 15 is made from shape memory alloy over all of its length, for example.

So that the sections T made from shape memory alloy can be more clearly distinguished from the main part P of the rim members or surrounds 13, they have been emphasized in FIG. 1, by shading with dots or with cross-hatching.

In reality, however, ignoring any merging line at their ends, they are not necessarily distinguished from the mainpart P of the rim members or surrounds 13, and to the contrary are preferably geometrically continuous with these.

The shape memory alloys used for making the sections T in question may, in the usual way, be alloys of nickel and titanium, for example, or copper-zinc-aluminum alloys.

The neutral material from which the main part P of the rim members or surrounds 13 is made is in practise a metal or alloy chosen because it can be welded to such alloys.

The corresponding welding operation uses a laser, for example.

The section T1 made from shape memory alloy of the rim members or surrounds 13 situated on the temple side thereof preferably extends above the tenon 20 which, provided for the purpose of hinging the corresponding supporting side piece 12, projects from the rim member or surround 13, forming an extension of it, for example being itself welded to the main part P of this rim member or surround 13.

In the embodiment shown in FIG. 1 the shape memory alloy section T1 essentially extends over only the temple side of the rim members or surrounds 13 without extending significantly into the upper side thereof.

Be this as it may, like the main part P of the rim members or surrounds 13, and continuously therewith, the shape memory alloy section T1 is formed with an internal bezel 22, meaning a groove with a triangular transverse profile, for example and as shown, adapted to hold the lens 14 concerned, the lens 14 featuring to this end, projecting from its edge, a rib 23 the transverse profile of which is complementary to that of a bezel 22 of this kind.

As this arrangement is of itself well known in this art it will not be described in more detail here.

The shape memory alloy sections T1, T2 thus employed preferably have different characteristics, and in particular expansion characteristics.

For example, the section T1 on the temple side is preferably capable of expanding by an amount in the order of 8%, greater in any event than the expansion capacity, approximately 5%, for example, of the section T2 which, situated on the nose side, is common to both the rim members or surrounds 13.

Be this as it may, in the usual manner the alloys employed are able to adopt either of two distinct structural phases, namely a so-called austenitic phase and a so-called martensitic phase between which the corresponding expansion occurs.

In practise the austenitic phase is the retracted phase and is stable at ambient temperature, whereas the martensitic phase, which is therefore the expanded phase, entails cooling to a temperature significantly lower than the lowest usual climatic temperatures, for example a temperature in the order of −60° C. to −80° C.

The length of the shape memory alloy sections T is chosen to be sufficient for their overall expansion to "open up" the rim members or surrounds 13 so that lenses 14 can be fitted thereto.

The length of the section T1 on the temple side is in the order of 20 mm, for example, which corresponds to an overall expansion of 1.6 mm when, as indicated hereinabove, the expansion between the two phases is 8%, and the length of the section T2 on the nose side is in the order of 15 mm, corresponding to an overall expansion of 0.75 mm when it expands by 5%, also as described above.

The front assembly 11 in accordance with the invention can therefore be used, that is to say the lenses 14 can be fitted into the rim members or surrounds 13, in the manner now to be described.

After cooling the front assembly 11 as a whole to a temperature between −60° C. and −80° C., for example using a blast of previously cooled air channeled through any form of blower nozzle, a first stage involves fitting a lens to one of the rim members or surrounds 13 only and the shape memory alloy section T1 on the temple side thereof returning to ambient temperature, followed by the fitting of a lens to the second of said rim members or surrounds 13 under the same conditions and returning to ambient temperature of the shape memory alloy section T1 on the temple side.

As a second stage the temperature of the shape memory alloy section T2 constituting the crossmember 16 common the the two rim members or surrounds 13 is returned to ambient temperature, which completes closing of them onto the lenses 14 that they grip.

In the embodiment shown in FIG. 4, the shape memory alloy sections T1 are disposed on the nose side on the rim members or surrounds 13, there being only one bar 15 of the neutral metal, identical or not to that constituting the main part P of said rim members or surrounds 13, separating them from the shape memory alloy section T2 constituting the crossmember 15 common to both of them.

Thus in this embodiment the two shape memory alloy sections T1, T2 used are on the nose side.

In the embodiment shown in FIG. 5 the shape memory alloy sections T1 are disposed on the temple side of the rim members or surrounds 13, as described previously for the embodiment shown in FIG. 1, but differ from this embodiment in that each also extends onto the upper side of said rim members or surrounds 13, over a part of the length thereof.

In other words, in the case shown where the rim members or surrounds 13 form a localized corner in the upper part of the temple side, the shape memory alloy sections T1 constitute both sides of the corresponding corner.

Also, in the embodiment shown in FIG. 5 there exists on the nose side of the rim members or surrounds 13 an individual shape memory alloy section T2 for each of them, the central bridge member 15 being reduced to a bar 18.

In practise the shape memory alloy sections T2 extend below this bar 18.

In the foregoing description and in the drawings no mention has been made of the nose pads with which eyeglass frame front assemblies are usually provided, for reasons of simplicity.

It is to be understood that such nose pads are also provided on the front assembly 11 in accordance with the invention, whether these are individual pads or a saddle-shaped member common to both of the rim members or surrounds 13.

The present invention is not limited to the embodiments described and shown, but encompasses any variant execution and/or combination of the various parts thereof.

There is claimed:

1. Eyeglass frame front assembly comprising two rim members each adapted to substantially hold and contact a respective lens and a bridge member joining said two rim members together, wherein each rim member comprises two shaped parts each made of a shape memory alloy and a main part made of a neutral material, said two shape memory alloy parts having different thermal expansion characteristics.

2. Assembly according to claim 1, wherein one of said two shape memory alloy parts is on the nose side of the respective rim member and the other is on the temple side.

3. Assembly according to claim 2, wherein each of said rim members comprise a tenon serving for the attachment of a side support member and said part of each rim member of the temple side extends above said tenon.

4. Assembly according to claim 3, where said shape memory alloy part on the temple side of each rim member extends to a top part of said rim member.

5. Assembly according to claim 1, wherein each of said shape memory alloy parts is geometrically continuous with said main part and shape memory alloy parts and said main part together define an interior bezel.

6. Assembly according to claim 1, wherein both of said shape memory alloy parts are on the nose side of the respective rim member.

7. Assembly according to claim 1, wherein said bridge member comprises a crossmember common to said two rim members and one of said shape memory alloy parts forms part of said crossmember.

8. Assembly according to claim 7, wherein all of said crossmember is of shape memory alloy.

* * * * *